United States Patent Office 2,898,377
Patented Aug. 4, 1959

2,898,377

POLYMERIC BUTADIENE PEROXIDE

Carleton T. Handy and Henry S. Rothrock, Wilmington, Del., assignors to E. I. du Pont de Nemours and Company, Wilmington, Del., a corporation of Delaware No Drawing. Application February 27, 1953
Serial No. 339,446

5 Claims. (Cl. 260—610)

This invention relates to new polymeric butadiene peroxides, to their preparation, and to their conversion to glycols.

It is known that the reaction of certain substituted 1,3-butadienes with molecular oxygen, under ordinary conditions of temperature and pressure, can result in the formation of polymers which have alternate hydrocarbon and peroxy groups. To our knowledge, however, there has been no reported instance of a polymeric peroxide of butadiene itself having peroxy groups as an integral part of the main polymer chain, or of a stable polymeric peroxide of butadiene. In fact, the literature warns that exposure of butadiene to air or oxygen may lead to the formation of compounds which detonate on being subjected to mild heat or mechanical shock.

It is an object of the present invention to provide a polymeric butadiene peroxide in which the peroxy groups are an integral part of the main polymer chain. Another object is to provide a polymeric peroxide of butadiene which is relatively stable toward heat and shock. Yet another object is to provide a novel polymer which is susceptible of being reduced to a mixture containing 1,2- and 1,4-four-carbon glycols. A further object is to provide a novel route to 1,2- and 1,4-four-carbon glycols from butadiene. Still another object is to provide a method of preparing novel polymeric butadiene peroxides. Other objects will appear hereinafter.

According to the present invention, it has been found that a polymeric butadiene peroxide having peroxy groups as an integral part of the main polymer chain is obtained by reaction of oxygen with butadiene in solution at temperatures in the range of from about 60 to about 110° C., preferably under pressure. The polymeric peroxide so produced exhibits a marked stability toward heat and shock, and on chemical or catalytic reduction affords a mixture containing both 1,2- and 1,4-four-carbon glycols in good yield.

In one method for preparing the new polymeric butadiene peroxides of this invention, a pressure reactor is charged with a solution of butadiene in a neutral inert medium which is a solvent for the polymeric butadiene peroxide, oxygen is then injected to a convenient pressure generally between 40 and 500 lb./sq. in. The pressure is maintained within the system by further injections of oxygen. The reaction is conveniently carried out at 85–90° C. After approximately 0.2 to 0.7 mol of oxygen per mol of butadiene has been absorbed, the reaction mixture is cooled, the pressure released, and the reactor is opened and discharged. Excess butadiene is removed from the reaction mixture by distillation under reduced pressure, providing a solution of polymeric butadiene peroxide in the solvent.

The examples which follow are submitted to illustrate and not to limit this invention.

*Example 1.*—A solution containing 16.2 grams (0.3 mol) butadiene per 100 ml. of benzene was charged into a pressure vessel, pressured to 50 lb./sq. in. with oxygen, heated to 85° C., and oxygen introduced to produce a pressure of 120 lb./sq. in. Heating was continued for a total of eight hours, during which time additional oxygen equivalent to 0.4 mol/mol of butadiene was added to maintain the pressure. The product was a clear pale yellow liquid which contained titratable peroxide equivalent to a 42% conversion of butadiene to the peroxide. Removal of the benzene solvent by evaporation under reduced pressure left a viscous oil whose weight corresponds to a 43% conversion to the peroxide, indicating a very high yield in the peroxidation reaction. Anal. calc'd for $(C_4H_6O_2)$: C, 55.8; H, 7.0%. Found: C, 55.0; H, 7.2%.

*Example 2.*—The effect of temperature on polyperoxide yield may be illustrated by summarizing the results of a series of experiments in which solutions containing 0.05 mol butadiene/100 m. benzene were pressured with oxygen (100 lb./sq. in.) for eight hours at the indicated temperatures.

| Reaction Temperature (° C.) | Conversion of Butadiene to Titratable, Benzene-Soluble Peroxide, percent |
|---|---|
| 85 | 4 |
| 90 | 14 |
| 95 | 24 |
| 100 | 32 |
| 105 | 42 |
| 110 | 26 |

(Note: At temperatures above 95° C. an oily, dark, benzene insoluble fraction was formed, indicating secondary reaction. At 110° C. the initial reaction was much more rapid and oxygen absorption leveled off after six hours.)

*Example 3.*—The effect of butadiene concentration on peroxide formation is shown in the table below which is a summary of a series of experiments carried out at 90° C. under 100 lbs./sq. in. pressure for eight hours, varying the butadiene concentration from 0.05 to 0.4 mol/100 ml. benzene.

| Mols Butadiene/100 ml. Benzene | Percent Conversion to Peroxide |
|---|---|
| 0.05 | 14 |
| 0.1 | 25 |
| 0.2 | 47 |
| 0.3 | 55 |
| 0.4 | 51 |

*Example 4.*—A pressure vessel was charged with 5.4 grams butadiene, 25 ml. benzene and 0.01 gram alpha, alpha'-azodiisobutyronitrile (a free-radical-yielding initiator) at 0° C. and pressured to 200 lb./sq. in. with oxygen. The vessel was sealed and then rotated in an air bath heated to 75° C. for eight hours. When the reactor had cooled and the residual pressure was measured at 0° C., it was found that 14 mol percent of oxygen had been absorbed. Titration of the resulting clear solution indicated peroxide equivalent to 18% of the available butadiene.

*Example 5.*—A stainless steel pressure vessel was chilled to 0° C. and a solution of 16.2 grams (0.3 mol) of butadiene in 100 ml. of 1,1,1-trichloroethane was introduced. This was pressured with sufficient oxygen to give an equilibrium pressure of 120 lb./sq. in. at 85° C. The vessel was heated at 85° C. for eight hours with agitation, and repressured periodically with oxygen to maintain the initial pressure. A total of 0.13 mol of oxygen was absorbed. The product was clear and very nearly colorless. Iodimetric titration revealed the presence of peroxide equivalent to 49% of the butadiene charged.

Evaporation of the solvent left 12.2 grams (47%) of the viscous oily peroxide.

*Example 6.*—A stainless steel pressure vessel was chilled and charged with a solution of 21.6 grams (0.4 mol) of butadiene in 100 ml. of benzene. This was pressured with sufficient oxygen to produce an internal pressure of 500 lbs./sq. in. at 85° C. The system was held at 85° C. for eight hours with gentle agitation, the oxygen pressure being maintained. The peroxide titer corresponded to a 43% conversion of butadiene to the polymeric peroxide.

*Example 7.*—A solution of 8.2 grams (0.095 mol) of polymeric butadiene peroxide prepared according to Example 1 in 30 ml. of dioxan was added dropwise to a stirred solution of 12.5 grams (0.33 mol) of lithium aluminum hydride in 300 ml. of absolute ether. After the addition was complete reflux was maintained for three hours and the resulting solution was allowed to stand overnight. Seventy ml. of acetic anhydride was added cautiously, followed by a more rapid addition of a mixture of 50 ml. of additional acetic anhydride and 30 ml. of pyridine. The resulting mixture was heated, permitting the ether to distill slowly until the internal temperature reached 70° C. The residue was extracted with chloroform. The extracts were subjected to fractional distillation, yielding fractions boiling between 100 and 134° C./20 mm. which represent mixtures of 3-butene-1,2-dioldiacetate and 2-butene-1,4-dioldiacetate in the approximate ratio of 1:2. Total conversion to the dioldiacetates corresponded to 52% of theory based on the peroxide charged.

As reflected by the working examples, temperature and butadiene concentration are critical variables in the production, in good yield, of the polymeric butadiene peroxide of this invention.

Temperatures in the range of 60–110° C. are operable but the best results, from the standpoint of reaction rate and yield of desired benzene-soluble polymeric butadiene peroxide, are realized in the more restricted range of 75–100° C. and this therefore embraces the preferred operating temperature conditions.

The concentration of the butadiene in the solution should range from 1.0 to 0.05 mol per 100 ml. of solvent, which corresponds to between 0.10 and 2.0 liters of benzene per mol of butadiene. The preferred system for high conversions to desired benzene-soluble polymeric butadiene peroxide, with minimum of by-product formation, contains from 0.3 to 0.6 mol of butadiene per 100 ml. of solvent.

The time of reaction is a variable factor and depends upon the conditions and method used in the peroxidation. The reaction is permitted to proceed until approximately 0.2 to 0.70 mol equivalent of oxygen has been consumed. However, continuation until about 0.50 mol equivalent of the oxygen has been consumed represents the preferred practice.

The amount of oxygen injected into the system depends upon the pressure conditions selected for operation, and should be such that a reserve of unreacted oxygen is always present in the reactor. The process can be operated as a static system in which oxygen is injected to a pressure such as to provide a mol ratio of oxygen:butadiene greater than about 0.50 and the reaction is permitted to proceed without any further addition of oxygen. If desired, however, the pressure may be maintained at the selected level by compensating periodically for the pressure drop by injecting oxygen into the system. Oxygen under pressure within the range of 40 to 500 lbs./sq. in., at the operating temperature, has been found to provide the required oxygen concentration for effecting the peroxidation of the butadiene efficiently. If desired, pressures in excess of 500 lbs./sq. in. can be used. The process can be operated continuously, if desired, with recycling of unconverted butadiene and oxygen. Air may be used in place of oxygen. A desirable modification is to recycle a portion of the reactor effluent containing the formed peroxide which will then serve as a promoter for the peroxidation reaction.

Any neutral organic compound which is unreactive with oxygen and which is a solvent for polymeric butadiene peroxide can be used as the reaction medium. Suitable media are benzene, dimethyl oxalate, cyclohexanone, methyl chloroform, etc. Of these a preferred medium is benzene because of its availability, inertness under the conditions of reaction, and good solvency for the polymeric butadiene peroxide. Examples of non-neutral solvents unsuitable for the peroxidation process of this invention are acetic acid and pyridine.

The products of this invention can be made in the presence or absence of promoters. The use of promoters is advantageous in reducing the induction period of the reaction and therefore in improving the economics of the process. The useful promoters include the formed polymeric butadiene peroxide and those compounds which yield active free radicals under the conditions of reaction. The preferred promoters of the latter type are azonitriles of the kind disclosed and claimed in U.S. Patent 2,471,951. Examples are alpha,alpha'-azobis(alpha-dimethylvaleronitrile), dimethyl and diethyl alpha,alpha'-axodiisobutyrate, 1,1'-azodicyclohexanecarbonitrile, etc. Other promoters which can be employed are the organic peroxides, such as benzoyl peroxide, di-tert.-butyl peroxide, cumene hydroperoxide, and the like.

Where preformed polymeric butadiene peroxide itself is added or recycled as a promoter, relatively large amounts may advantageously be employed, inasmuch as the final product is not thereby contaminated and the polymeric peroxide is relatively stable under the reaction conditions. Amounts ranging from about 1 to about 10 percent, by weight of butadiene being peroxidized, are preferred. Where other more active promoters are used, this amount will vary from about 0.01 to about 1 percent, preferably from 0.1 to 0.5 percent. In general, choice of the amount of promoter will depend on considerations of reduced induction period and maximum economy of operation.

Example 7 illustrates conversion of the polymeric butadiene peroxide to a mixture of 1,2- and 1,4-butenediols (isolated as the acetates) by reduction with lithium aluminum hydride. In place of this particular reducing agent there can be reacted other chemical reducing agents, e.g., zinc and hydrochloric acid, iron and acetic or hydrochloric acid, etc. Alternatively, the reduction can be effected electrolytically.

Solvents for the reduction step may comprise in general any organic compound which is a solvent for the peroxide and is unreactive in the reduction system. Examples of such solvents are dioxan, benzene, acetic acid, and the like.

The polymeric butadiene peroxide of this invention is soluble in acetic acid, benzene, dimethyl oxalate, cyclohexanone, methyl chloroform, acetone, and dioxan, and limitedly soluble in methanol and tertiary butyl alcohol. It is an oily non-volatile product whose average composition corresponds to the general formula $(C_4H_6O_2)_x$, where $x$ is 4 to 10; is sensitive only to severe impact. When heated, it shows no visible evidence of decomposition until the temperature reaches 100° C. At 150° C., decomposition is extensive but not complete. In solution in benzene, it can be stored for long periods without substantial loss in peroxide content. Thus, at room temperature, it loses only 11% of its peroxide content during three months storage. In dilute benzene solution, it has a half-life of 13 hours at 100° C.

The polymeric butadiene polyperoxide is useful for conversion to 1,2- and 1,4-butene-and butanediols and to other valuable chemicals.

Inasmuch as numerous embodiments of the invention are possible without departing from the spirit and scope thereof, it is petitioned that the invention not be limited to the specific embodiments hereinbefore described.

We claim:
1. Normally liquid polymeric butadiene peroxide which can be heated to about 150° C. without complete decomposition, said polymeric butadiene peroxide being one which (a) has an average composition corresponding to the formula $(C_4H_6O_2)_x$, where $x$ is 4 to 10, (b) contains substantially all its oxygen as titratable peroxide, (c) contains units of the formula

[—C$_4$H$_6$—O—O—C$_4$H$_6$—O—O—]

(d) contains divalent C$_4$H$_6$ radicals bonded to oxygen in the 1 and 2 positions, and (e) contains C$_4$H$_6$ radicals bonded to oxygen in the 1 and 4 positions.

2. A process for the preparation of butenediols which comprises chemically reducing the butadiene peroxide of claim 1 in an inert solvent and separating 1,2- and 1,4-butenediols from the reaction mixture.

3. A process for the preparation of butenediols which comprises subjecting the normally liquid polymeric butadiene peroxide of claim 1 in an inert solvent therefor to reaction with lithium aluminum hydride and separating 1,2- and 1,4-butenediols from the reaction mixture.

4. A process for the preparation of normally liquid polymeric butadiene peroxide which can be heated to about 150° C. without complete decomposition, said polymeric peroxide being one which (a) has an average composition corresponding to the formula $(C_4H_6O_2)_x$, where $x$ is 4 to 10, (b) contains substantially all its oxygen as titratable peroxide, (c) contains units of the formula

[—C$_4$H$_6$—O—O—C$_4$H$_6$—O—O—]

(d) contains divalent C$_4$H$_6$ radicals bonded to oxygen in the 1 and 2 positions, and (e) contains divalent C$_4$H$_6$ radicals bonded to oxygen in the 1 and 4 positions, which process comprises (1) reacting butadiene and oxygen at a temperature in the range of 60° C. to 110° C. in the presence of a reserve of unreacted oxygen and from 0.1 to 2.0 liters, per mol of butadiene, of a neutral inert medium which is a solvent for butadiene and for said polymeric butadiene peroxide, (2) continuing said reaction until an amount of oxygen in the range from about 0.2 to about 0.7 mol, per mol of butadiene, is absorbed, and (3) separating the aforesaid polymeric peroxide from the reaction mixture as substantially the sole non-volatile benzene-soluble component thereof.

5. A process of claim 4 in which the neutral inert medium is benzene.

References Cited in the file of this patent

UNITED STATES PATENTS

| 2,369,520 | Barns | Feb. 13, 1945 |
| 2,447,794 | Brewer | Aug. 24, 1948 |
| 2,491,926 | Lorand et al. | Dec. 20, 1949 |

FOREIGN PATENTS

| 576,255 | Great Britain | Mar. 26, 1946 |
| 621,735 | Great Britain | Apr. 19, 1949 |

OTHER REFERENCES

Sommerlung: Chemie and Chemische Technische Vorträge, N.F.34, 10 to 16, 70 to 72 (1936).

Troyan: War Production Board Report, Rm.–11, dated July 28, 1943 (pages 1, 2, and 3 relied on); cited by applicant during interference proceedings.

Kern et al.: Makromolekulare Chemie, vol. 7 (1951), pp. 199–204 (6 pages).

Jr. Applied Chem., 1, 380 to 382 (September 1951).

Matic et al.: J. Chem. Soc. (London), 1952, pp. 2679–82.

UNITED STATES PATENT OFFICE
CERTIFICATE OF CORRECTION

Patent No. 2,898,377                                                       August 4, 1959

Carleton T. Handy et al.

It is hereby certified that error appears in the printed specification of the above numbered patent requiring correction and that the said Letters Patent should read as corrected below.

Column 2, line 48, in the Table, second column thereof, fourth item, for "55" read -- 51 --; line 49, for "51" read -- 55 --; column 4, line 27, for "axodiisobutyrate" read -- azodiisobutyrate --; column 5, line 15, after "contains" insert -- divalent --.

Signed and sealed this 5th day of January 1960.

(SEAL)
Attest:

KARL H. AXLINE                                                    ROBERT C. WATSON
Attesting Officer                                            Commissioner of Patents